(12) United States Patent
Newman

(10) Patent No.: US 6,826,492 B2
(45) Date of Patent: Nov. 30, 2004

(54) METHOD OF MANAGING A WELL FILE RECORD AT A WELL SITE

(75) Inventor: Frederic M. Newman, Midland, TX (US)

(73) Assignee: Key Energy Services, Inc., Midland, TX (US)

( * ) Notice: Subject to any disclaimer, the term of this patent is extended or adjusted under 35 U.S.C. 154(b) by 101 days.

(21) Appl. No.: 09/839,444

(22) Filed: Apr. 23, 2001

(65) Prior Publication Data

US 2002/0156591 A1 Oct. 24, 2002

(51) Int. Cl.$^7$ .......................... G06F 19/00; G06F 17/60
(52) U.S. Cl. ............................................ 702/45; 705/28
(58) Field of Search ........................ 702/45, 5; 705/1, 705/22, 28

(56) References Cited

U.S. PATENT DOCUMENTS

| | | |
|---|---|---|
| 3,760,362 A | 9/1973 | Copland |
| 3,921,152 A | 11/1975 | Hagar |
| 4,187,546 A | 2/1980 | Heffernan |
| 4,393,485 A | 7/1983 | Redden |
| 4,531,204 A | 7/1985 | Vanderschel |
| 4,545,017 A | 10/1985 | Richardson |
| 4,604,724 A | 8/1986 | Shaginian |
| 4,794,534 A | 12/1988 | Millheim |
| 4,916,617 A | 4/1990 | Norwood |
| 5,051,962 A | 9/1991 | Eaton |
| 5,132,904 A | 7/1992 | Lamp |
| 5,216,638 A | 6/1993 | Wright |
| 5,237,539 A | 8/1993 | Selman |
| 5,278,549 A | 1/1994 | Crawford |
| 5,864,772 A * | 1/1999 | Alvarado et al. ............... 702/9 |
| 6,079,490 A | 6/2000 | Newman |
| 6,101,445 A * | 8/2000 | Alvarado et al. ............... 702/9 |
| 6,377,189 B1 * | 4/2002 | Newman .................. 340/854.6 |
| 6,498,988 B1 * | 12/2002 | Robert et al. ................... 702/6 |
| 6,519,568 B1 * | 2/2003 | Harvey et al. .................. 705/1 |

FOREIGN PATENT DOCUMENTS

WO    WO 95/05609    2/1995

* cited by examiner

Primary Examiner—John Barlow
Assistant Examiner—Toan M. Le
(74) Attorney, Agent, or Firm—Howrey Simon Arnold & White, L.L.P.

(57) ABSTRACT

A method of managing well file records includes storing a well file on a first computer at a home base location and communicating the well file to a second computer at a remote well site. The well file serves as a blueprint that describes the well and its various components, and can be a valuable a reference tool for crews doing repair or service work on the well. When the work involves replacing or changing any of the well components, the crew can immediately update the well file using the computer at the well site. In some cases, part numbers and other information are scanned into the computer to minimize human error. Information between the two computers is accomplished by way of a wireless communication link and the Internet.

19 Claims, 1 Drawing Sheet

METHOD OF MANAGING A WELL FILE RECORD AT A WELL SITE

BACKGROUND OF THE INVENTION

1. Field of the Invention

The invention generally pertains to managing well file records at a well site and more specifically to managing well file records that change with service work being performed on a well at the well site.

2. Description of Related Art

Wells are used to draw petroleum, water or other fluid up from within the ground. Owners or operators of a well often have a well file that serves as a blueprint that describes the well and its components. The well file is often referred to whenever work is done on the well.

After a well is set up and operating, various service operations are periodically performed to maintain the well. Such service operations may include replacing worn parts such as a pump, sucker rods, inner tubing, and packer glands; pumping chemical treatments or hot oil down into the well bore; and pumping cement into the well bore to partially close off a portion of the well (or to shut it down entirely). Since wells are often miles apart from each other, the maintenance or service operations are usually performed by a mobile unit or service vehicle having special onboard servicing equipment suited to perform the work. Some examples of service vehicles include a chemical tank truck or trailer, a cement truck or trailer, a hot-oiler tank truck or trailer, and a portable work-over service rig having a hoist to remove and install well components (e.g., sucker rods, tubing, etc.).

Of course, such work is done at the well site, which is usually at a location that is quite remote with respect to the home office of the well owner or operator. Since the well file is often kept at the home office, field crews working on the well often do not have ready access to the well file, which can create several problems. First, not having the well file to refer to at the well site makes it difficult for the crews to make informed decisions on how to proceed in servicing the well, especially when something unexpected occurs. Second, if changes are made to the well, such as replacing a worn part, details of the change may never get back to those who are responsible for updating the well file. Thus, well files can eventually become very outdated. Third, current well files are often recorded on paper, which are inherently time consuming and difficult to update.

SUMMARY OF THE INVENTION

To avoid the problems and limitations of current methods of maintaining well files, it is an object of the invention to use a computer for updating well files.

A second object is to communicate a well file from a home base computer to a remote mobile computer at the well site using a wireless communication link.

A third object is to update a well file using a computer at the well site.

A third object is to communicate a well change from a computer at the well site to another computer at remote home base.

A fourth object is to use a bar code scanner or a RFID sensor to enter into a computer a part number of a part that is to be added to the well.

A fifth object is to create an electronic well file that includes records of consumable components such as chemical treatments.

A sixth object is enter into a computer a well site identifier that allows a crew at the well site to access the appropriate well file for the well being serviced.

A seventh object is to enter into a computer a company identifier that helps identify which of several companies were involved in a particular operation.

An eighth object of the invention is use an access code of limited usefull life that allows a contractor to update a well file, provided the contractor's work had been witnessed. The access code expires after the contractor updates the well file, thus preventing the contractor from making additional well file changes that may not be authorized.

These and other objects of the invention are provided by storing a well file on a first computer and communicating the well file to a second computer at the well site. Information about changes made to the well can be entered into the second computer and communicated back to the first computer.

DESCRIPTION OF THE PREFERRED EMBODIMENT

Figure 1:
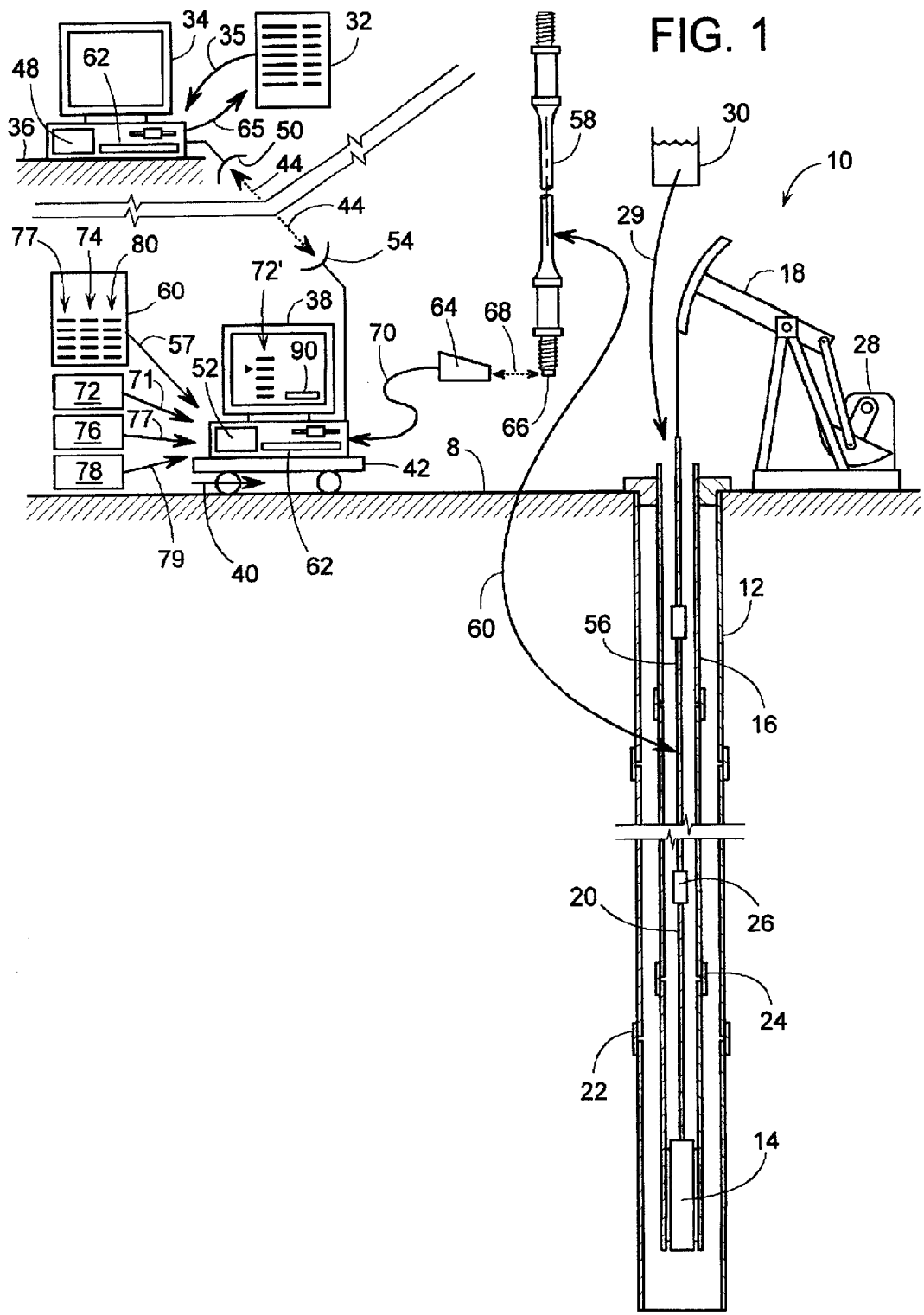
FIG. 1 is a schematic diagram illustrating a method of managing a well file record according to a currently preferred embodiment of the invention.

FIG. 1 illustrates a method of managing a well file record of a plurality of components of a well 10 at a well site 8. The term, "component" refers to any item of which a particular well is comprised, wherein the component may be a consumable or non-consumable item. Well 10 is schematically illustrated to encompass any apparatus for drawing a fluid (e.g., oil, gas, water, etc.) from the ground. In some embodiments of the invention, well 10 includes a string of outer piping known as casing 12. When perforated, casing 12 provides a conduit that conveys fluid from within the ground to the inlet of a submerged reciprocating pump 14. An inner string of pipe, known as tubing 16, provides a discharge conduit that conveys the fluid from the outlet of pump 14 to the surface. A powered pivoting beam 18 moves a string of sucker rods 20 up and down, which in turn moves the pump's piston up and down to pump the fluid.

It should be noted that casing 12, tubing 16, sucker rods 20, pump 14 and beam 18 represent just a few examples of the numerous components that can make up a well, and it is conceivable that a well may not have one or more of these components. Examples of other well components include, but are not limited to, casing couplings 22; tubing couplings 24; sucker rod couplings 26; packer glands; various piece parts of pump 14, such as seals and valves; various parts associated with beam 18, such as a drive motor 28; and various consumable and non-consumable fluids 30 that may be added (indicated by line 29) to the well bore, such as hot oil, acid, or cement. The list of possible components could be considered endless, as new components are continually being developed.

To keep a record of a well's current list of components, and make the record readily available to personnel on and off the well site, a well file 32 is created and/or such as Microsoft Word, Excel, Access; Visual Basic; C++etc. The term, "computer" used herein and below refers to any device for storing and/or possessing digital information. Examples of a computer include, but are not limited to items known as personal computers, PC, desktop computer, laptop, notebook, PLC (programmable logic controller), data logger, etc. The term, "well file" refers to data that identifies a plurality of components associated with a well at a particular well site. The data can include such things as part names, part numbers, serial numbers, model numbers, manufacturer or supplier name, part descriptions, quantities, well depth location, gallons, solution concentrations, age, size, etc. To make well file 32 accessible to the well owner and others that are not at the well site, computer 34 is preferably at a home base location 36 that is remote relative to well site 8. In other words, computer 34 is not at the well site itself. The term, "well site" refers to the immediate property or land on which the well is contained or within a one-mile radius of the well bore, whichever is more.

To make well file 32 readily available to field personnel that are repairing or otherwise servicing well 10, another computer 38 is transported to well site 8, as indicated by arrow 40. Transporting computer 38 is preferably accomplished by conveying computer 38 on a service vehicle 42 that is being used by the field personnel in servicing well 10. Examples of vehicle 42 include, but are not limited to, a work-over unit, a cement truck for conveying and pumping cement, and a tanker for conveying and pumping an acid or some other fluid. A work-over unit is generally a truck with a hoist and other tools that facilitate the installation and removal of tubing, sucker rods, casing, and may even be used in actually drilling the well bore itself.

Communicating well file 32 from computer 34 to computer 38 is preferably done through a wireless communication link 44. The term "wireless communication link" refers to data being transmitted over a certain distance, wherein over that certain distance the data is transmitted through a medium of air and/or space rather than wires. Wireless communication link 46 is schematically illustrated to represent a wide variety of systems that are well known to those skilled in the art of wireless communication. For example, with a modem 48 and an antenna 50 associated with computer 34, and another modem 52 and an antenna 54 for computer 38, data of well file 32 can be exchanged over the Internet between computers 34 and 38. Data of well file 32 can assume any of a variety of common formats including, but not limited to HTML, e-mail, and various other file formats that may depend on the particular software being used.

In a preferred mode of operation, well file 32 is communicated over the Internet from computer 34 to computer 38. In the process of repairing, upgrading, or otherwise servicing well 10, service personnel may change one or more of the well components. For example, a worn sucker rod 56 may be replaced by a new sucker rod 58, as indicated by arrow 60. The service personnel would then input into computer 38 (or another computer) a well file change 60 that documents that sucker 56 has been replaced by rod and may document whatever other changes may have taken place at the well. The information could be entered (indicated by arrow 57) manually using a conventional keyboard 62 or be entered in some other manner. For example, an instrument 64, such as a barcode scanner or a RFID (radio frequency identification) sensor could sense on sucker rod 58 a part identifier 66, such as a bar code label or an embedded or surface mounted RFID device. The communication link, whether it is light for a barcode scanner or an electromagnetic field for the RFID device, is schematically illustrated and identified by line 68. The sensed information is conveyed through line 70 and entered into computer 38 as a digital identification value (e.g., part number, model number, serial number, or some other alphanumeric name).

In some versions of the invention, service personnel enter (indicated by arrow 71) a well site identifier 72 into computer 38 by using keyboard 62 and/or selecting from a menu of well site identifiers 72'. Well site identifier 72 could be some alphanumeric value that identifies the well by a name or address. This could allow service personnel access to the right well file and ensure that well file change 60 will be matched with the appropriate well file. Well file change 60 could also include a date 74 that identifies when a particular change occurred.

In some cases, a company identifier 76 is entered (indicated by arrow 77) into computer 38 to identify by name or some code which company, contractor, and/or service person was involved in changing any of the components of well 10. When there is more than one company or independent contractor working on well 10, a second company identifier 78 can be entered (indicated by arrow 79) into computer 38 to identify the second company. In this way, well file change 60 can document which company, contractor or individual made which component changes. The term, "independent contractor" refers to cases where neither contractor is an employee of the other. With proper association, well file change 60 lists several company identifiers 77, well file line-item changes 80 (part numbers, descriptions, etc.), and dates 74.

Once well file change 60 is entered into a computer, the change is accessible from computer 34 using wireless communication link 44 and the Internet or some other appropriate network protocol. To complete the process, well file 32 can be updated to reflect the changes indicated by well file change 60. Updating well file 32 can be done at computer 38 or at computer 34 (or at yet another computer). Updating well file 32 at computer 34 is indicated by arrow 65.

In some versions of the invention, a contractor who had been working at well site 8 can only make a change to well file 32 if the change to well 10 was witnessed by another party (e.g., a representative of the one who owns and/or controls well file 32). To do this, the witness enters into computer 38 (or another computer) information that indicates that the witness verifies that the contractor actually made the change to well 10. In response, computer 38 displays an access code 90 that the contractor needs in order to update well file 32 to reflect the change that the contractor has made to well 10. For example, access code 90 may be an eight-digit number (or some other alphanumeric value) that the contractor must enter into his computer before the contractor is allowed to make any changes to well file 32. Once the contractor enters access code 90, computer 34 provides the contractor with permission or access to make only limited changes to well file 32, such as only those changes that pertain to the work that was witnessed. After the contractor enters access code 90 and updates well file 32, the useful life of access code 90 is terminated, i.e., code 90 further limits (or entirely limits) the contractor's ability to alter or update well file 32. Thus, once the contractor updates well file 32, the expiration of code 90 prevents the contractor from making other changes to well file 32 that may not be authorized.

Although the invention is described with reference to a preferred embodiment, it should be appreciated by those skilled in the art that various modifications are well within the scope of the invention. Therefore, the scope of the invention is to be determined by reference to the claims that follow.

I claim:

1. A method of managing a well file record of a plurality of components of a well at a well site, comprising:

storing a well file at a first computer, wherein the well file includes information about the plurality of components of the well;

transporting a second computer to the well site;

providing a wireless communication link between the first computer and the second computer;

communicating the well file from the first computer to the second computer through the wireless communication link;

changing one of the plurality of components of the well at the well site;

inputting into the second computer a well file change that documents the step of changing one of the plurality of components of the well; and making the well file change on the second computer accessible to the first computer through the wireless communication link.

2. The method of claim 1, further comprising causing an instrument to sense a part identifier of a component added to the well at the well site, wherein the part identifier is associated with a digital identification value; inputting the digital identification value into the second computer, and using the digital identification value as part of the well file change.

3. The method of claim 2, wherein the part identifier is a bar code.

4. The method of claim 2, wherein the digital identification value represents an alphanumeric name.

5. The method of claim 2, wherein the instrument senses the part identifier by way of an electromagnetic field.

6. The method of claim 1, wherein the plurality of components includes cement.

7. The method of claim 1, wherein the plurality of components includes an acid.

8. The method of claim 1, wherein the plurality of components includes a sucker rod.

9. The method of claim 1, wherein the plurality of components includes tubing.

10. The method of claim 1, further comprising accessing the well file from the well site by entering a well site identifier into the second computer.

11. The method of claim 10, wherein the step of entering a well site identifier into the second computer is performed by selecting from a plurality of well site identifiers displayed on the second computer.

12. The method of claim 1, further comprising entering into the second computer a company identifier that helps identify a company involved in changing one of the plurality of components of the well.

13. The method of claim 1, further comprising updating the well file by incorporating the well file change into the well file.

14. The method of claim 1, wherein the well file change includes a digital identification value that helps identify which one of the plurality of components is being changed.

15. The method of claim 1, wherein the well file change includes a date that helps identify when one of the plurality of components is being changed.

16. A method of managing a well file record of a plurality of components of a well at a well site, comprising:

storing a well file at a first computer, wherein the well file includes information about the plurality of components of the well;

transporting a second computer to the well site;

providing a wireless communication link between the first computer and the second computer;

communicating the well file from the first computer to the second computer through the wireless communication link;

accessing the well file from the well site by entering a well site identifier into the second computer;

changing one of the plurality of components of the well at the well site;

entering into the second computer a company identifier that helps identify a company involved in changing one of the plurality of components of the well;

entering into the second computer a well file change that documents the step of changing one of the plurality of components of the well, wherein the well file change includes a digital identification value that helps identify which one of the plurality of components is being changed;

making the well file change on the second computer accessible to the first computer through the wireless communication link; and updating the well file by incorporating the well file change into the well file.

17. The method of claim 16, wherein the well file change includes a date that helps identify when one of the plurality of components is being changed.

18. A method of managing a well file record of a plurality of components of a well at a well site, comprising:

storing a well file at a first computer, wherein the well file includes information about the plurality of components of the well;

transporting a second computer to the well site;

providing a wireless communication link between the first computer and the second computer;

communicating the well file from the first computer to the second computer through the wireless communication link;

changing one of the plurality of components of the well at the well site;

witnessing the step of changing one of the plurality of components of the well at the well site;

entering into the second computer information that indicates that the step of changing one of the plurality of components of the well at the well site has been witnessed;

displaying on the second computer an access code of a limited useful life in response to entering into the second computer information that indicates that the step of changing one of the plurality of components of the well at the well site has been witnessed, wherein the access code allows the well file to be changed within the limited useful life of the access code;

with the aide of the access code, changing the well file to reflect the step of changing one of the plurality of components of the well; and terminating the limited useful life of the access code after changing the well file.

19. A method of managing a well file record of a plurality of components of a well at a well site, comprising:

storing a well file at a first computer, wherein the well file includes information about the plurality of components of the well;

transporting a second computer to the well site;

providing a wireless communication link between the first computer and the second computer;

communicating the well file from the first computer to the second computer through the wireless communication link;

accessing the well file from the well site by entering a well site identifier into the second computer;

having a first contractor change a first component of the plurality of components;

having a second contractor change a second component of the plurality of components;

entering into the second computer a first company identifier that helps identify the first contractor involved in changing the first component;

entering into the second computer a second company identifier that helps identify the second contractor involved in changing the second component;

entering into the second computer a fist well file change that documents the step of having the first contractor change the first component of the plurality of components, wherein the first well file change includes a first digital identification value that helps identify the first component;

entering into the second computer a second well file change that documents the step of having the second contractor change the second component of the plurality of components, wherein the second well file change includes a second digital identification value that helps identify the second component;

making the first well file change and the second well file change on the second computer accessible to the first computer through the wireless communication link; and updating the well file by incorporating the first well file change and the second well file change into the well file.

* * * * *

UNITED STATES PATENT AND TRADEMARK OFFICE
CERTIFICATE OF CORRECTION

PATENT NO. : 6,826,492 B2
DATED : November 30, 2004
INVENTOR(S) : Newman

It is certified that error appears in the above-identified patent and that said Letters Patent is hereby corrected as shown below:

Column 5,
Line 6, cancel "fink" and insert -- link --.

Signed and Sealed this

Twenty-second Day of February, 2005

JON W. DUDAS
*Director of the United States Patent and Trademark Office*